United States Patent [19]
Shimizu et al.

[11] Patent Number: 5,634,062
[45] Date of Patent: May 27, 1997

[54] SYSTEM FOR MANAGING HYPERTEXT NODE INFORMATION AND LINK INFORMATION

[75] Inventors: Takeshi Shimizu; Takahiro Saito; Osamu Nakamura, all of Kanagawa, Japan

[73] Assignee: Fuji Xerox Co., Ltd., Tokyo, Japan

[21] Appl. No.: 325,142

[22] Filed: Oct. 20, 1994

[30] Foreign Application Priority Data

Oct. 27, 1993 [JP] Japan .................................. 5-289761

[51] Int. Cl.$^6$ .................................................. G06T 11/00
[52] U.S. Cl. .......................... 395/762; 395/356; 395/357
[58] Field of Search ..................................... 395/144–148, 395/153, 154, 155, 156, 159, 160, 161, 600, 650, 140, 141, 613–615, 762, 776, 356, 357

[56] References Cited

U.S. PATENT DOCUMENTS 5,446,891   8/1995   Kaplan et al. ............................ 395/600

OTHER PUBLICATIONS

Pearl, Amy—Sun's Link Service: A Protocol for Open Linking. Hypertext Proceedings (1989).
J. Conklin, "Hypertext: An Introduction and Survey," Survey & Tutorial Series, 1987 IEEE, Sep. 1987, pp. 17–41.
F.G. Halasz et al., "Notecards in a Nutshell," Proceedings of the 1987 ACM Conference on Human Factors in Computer Systems, Toronto, Ontario, pp. 45–52.

*Primary Examiner*—Almis R. Jankus
*Attorney, Agent, or Firm*—Finnegan, Henderson, Farabow, Garrett & Dunner, L.L.P.

[57] ABSTRACT

A hypertext apparatus for managing hypertext composed of nodes holding information and of link information defining the relations between the nodes so as to display the information held by each of the nodes in accordance with the link information. The apparatus comprises: a node information management part for managing the nodes and for storing the information held by the nodes; a link information management part for putting into an order the link information defining the relations between the nodes; a link order manipulation part for manipulating the order of the link information; and a display control part for displaying the nodes successively in accordance with the order of the link information.

6 Claims, 7 Drawing Sheets

SYSTEM FOR MANAGING HYPERTEXT NODE INFORMATION AND LINK INFORMATION

BACKGROUND OF THE INVENTION

1. Field of the Invention

The present invention relates to a hypertext apparatus capable of setting up a plurality of links between nodes. More particularly, the invention relates to a hypertext apparatus for managing hypertext composed of nodes that hold information and of link information representing the relations between the nodes, the apparatus displaying the information from each node in accordance with the link information.

2. Description of the Related Art

Hypertext apparatuses were first developed as a system capable of holding information in units called nodes, of displaying character information held by the nodes, and of linking a plurality of nodes as desired. By offering such functions, the system structures various units of information and gains access to reference information.

Recent years have seen the advent of hypertext systems that handle node-held information (called node information hereinafter) composed of so-called multimedia information. Multimedia information comprises not only characters but also monochromatic and color images, sounds and motion pictures. A number of applications for systems of this kind have been proposed.

A typical conventional hypertext apparatus is introduced illustratively in "Hypertext: An Introduction and Survey," Computer, September 1987, IEEE.

Hypertext apparatuses of the above type present the concept of "links" as a way of defining the relationship between nodes that are the units in which to hold information. The information representing the links that define the node-to-node relationship for hypertext apparatuses is provided in two sets. Illustratively, node A and node B are each referenced in bidirectional fashion using the two sets of link information. Each node comprises not only the so-called node information representing the content of the node but also a plurality of link information items for controlling the node information. These nodes together with their information constitute the main part of hypertext and are stored in primary or secondary storage.

Given the link information constituted as outlined above, a plurality of nodes may form a tree structure or a network structure that allows the node information to be displayed in a structured manner. FIGS. 1 and 2 are views that illustratively describe the concepts of nodes and links for use with typical hypertext apparatuses. FIG. 1 is an overall conceptual view of a typical data constitution composed of nodes and links, and FIG. 2 is a view depicting typical link information held by a node.

In FIG. 1, reference numerals 11, 12, 13 and 14 represent a node each, and reference numerals 15, 16 and 17 stand for a link each. As illustrated, this is an example involving four nodes (node A, node B, node C, node D) among which are established links in a tree structure (link #1, link #2, link #3).

Link information is held by each node. As shown in FIG. 2, node A 11 has its link information furnished in a list format data constitution. Specifically, between a START label 20 and an END label 24 of the data constitution are first link information 21 (link #1), second link information 22 (link #2) and third link information 23 (link #3) which define the linking relations between node A 11 and the other nodes.

In other words, as depicted in FIG. 1, node A 11 has the link information designating three links (link #1, link #2, link #3) 15, 16 and 17 which define the relations between node A 11 on the one hand, and node B 12, node C 13 and node D 14 on the other. The link information of node A 11, as illustrated in FIG. 2, has pointers arranged in the list format data constitution connecting the first link information 21 (link #1), second link information 22 (link #2) and third link information 23 (link #3). The link information is stored in primary or secondary storage.

In the above example, the access to any of the nodes linked to node A 11 from the latter is executed by following successively the items of link information from the START label 20 to the END label 24 within the node 11. Each of the link information items (21–23) held in the list format data constitution designates the corresponding node which may be referenced as needed. The order in which to reference the nodes is fixedly determined by the order of the link information items connected by the list format pointers from the START label 20 to the END label 24.

In the example above, the access from node A 11 is made first to node B 12 then to node C 13 and to node D 14, in the order in which the first link information 21 (link #1), second link information 22 (link #2) and third link information 23 (link #3) are read out consecutively. If node A 11 is to be accessed conversely from node B 12, the link information (not shown) contained in the node 12 and pointing to node A 11 is utilized for bidirectional reference.

For hypertext apparatuses that employ the aforementioned data constitution, adding a new node together with its link information to the existing group of nodes simply means adding the link information to the end of the existing link information group arranged in the list format. How this takes place will now be described in more detail.

FIGS. 3 and 4 are views explaining how a new node E is added to the node A of FIG. 1. FIG. 3 is an overall conceptual view of the data constitution of a node group supplemented by a new node, and FIG. 4 is a view showing typical link information held by the node A when new link information is added. In this example, as shown in FIG. 3, the new node E 32 along with its link 33 is added to the data constitution of the node group in FIG. 1. This updates the link information of the node A, turning the node A into a node 31. As shown in FIG. 4, the link information held by the node 31 (node A) has new, fourth link information 41 attached to the end of the third link information 23, the existing last link information.

As indicated, setting an additional link to a node on the hypertext apparatus simply means adding the new link to the end of the group of link information items associated with the group of the nodes currently stored in primary or secondary storage. Heretofore, this scheme has resulted in a number of disadvantages in connection with the handling and reading of link information on the conventional hypertext apparatus.

One such disadvantage of the conventional hypertext apparatus is that the order in which to read link information is determined fixedly by the order in which the links were generated. The reading order of the link information cannot be modified as desired. Suppose that in the example of FIG. 2, the link information of the node A is supplemented by a link #4 with respect to the newly added node E. All that happens in this case is that, as shown in FIG. 4, the new link information is connected by a pointer simply to the end of the existing link information group. If the link information of the node A held in primary or secondary storage is read by use of a link information reading function such as one offered by NoteCards, all that is acquired is a list having link #1, link #2, link #3 and link #4 arranged therein in that order, i.e., the existing list simply supplemented by the new link #4 at its end. The problem here is that after a new node has been established, it is impossible to set anew the link information of that node as N-th link information that may be read out as desired by use of the link information reading function.

It follows that, on the hypertext apparatus, it is necessary to set the items of link information with their order of display properly established beforehand. Only this procedure makes it possible to create an application program that may be displayed on the screen by reading, from primary or secondary storage and within a predetermined time, the node information held by the nodes that are linked sequentially starting from a particular node.

Another disadvantage of the conventional hypertext apparatus is the absence of means for manipulating the order of link information items that define the relations between the nodes. For example, the operational function library offered by NoteCards for use with nodes and links has no means for putting into a desired order the nodes that are linked starting from a particular link, or for modifying the established order of the nodes. For this reason, it is impossible to describe or execute an operational script that would display, in a user-designated order, the nodes that are linked from a particular node.

It follows that regarding the application program mentioned above for use on the hypertext apparatus, the already established order of the links involved cannot be modified as designated by the user or by program.

SUMMARY OF THE INVENTION

It is therefore an object of the present invention to overcome the above and other deficiencies and disadvantages of the prior art and to provide a hypertext apparatus for which a plurality of links may be established to define relations between nodes, the apparatus allowing the order of the nodes to be established as desired or subsequently modified.

It is another object of the invention to provide a hypertext apparatus for which a plurality of links may be established to define relations between nodes, the apparatus managing hypertext composed of the nodes holding information and of link information defining the relations between the nodes, so that the information held by each of the nodes may be displayed in accordance with their link information items arranged into a desired order.

In carrying out the invention and according to one aspect thereof, there is provided a hypertext apparatus for managing hypertext composed of nodes holding information and of link information defining the relations between the nodes so as to display the information held by each of the nodes in accordance with the link information, the hypertext apparatus comprising: node information management means for managing the nodes and for storing the information held by the nodes; link information management means for putting into an order the link information defining the relations between the nodes; link order manipulation means for manipulating the order of the link information; and display control means for displaying the nodes successively in accordance with the order of the link information.

In a preferred structure according to the invention, the link information management means stores individual items of the link information in a data constitution that may be put into a desired order, and the link order manipulation means references, adds to, deletes and switches any of the individual items of the data constitution.

In another preferred structure according to the invention, the hypertext apparatus further comprises link information browse means for providing a list format display, on a display screen, of the order of at least a designated part of the link information managed by the link information management means.

In a further preferred structure according to the invention, the hypertext apparatus further comprises user interface means for directly manipulating the order of the link information displayed on the display screen by the link information browse means.

In a yet further preferred structure according to the invention, the link information management means has a storage part for storing the order of the link information.

According to another aspect of the invention, there is provided a hypertext apparatus for managing hypertext composed of nodes holding information and of link information defining the relations between the nodes so as to display the information held by each of the nodes in accordance with the link information, the hypertext apparatus comprising: node information management means for managing the nodes and for storing the information held by the nodes; link information management means for putting into an order the link information defining the relations between the nodes; and link order manipulation means for manipulating the order of the link information.

In operation, the hypertext apparatus of the invention manages hypertext composed of nodes holding information and of link information defining the relations between the nodes, and displays the information held by each of the nodes in accordance with the link information. In this setup, the node information management means manages the nodes and stores the information held by the nodes. The link information management means puts into an order the link information defining the relations between the nodes. When the link order manipulation means manipulates the order of the link information illustratively by adding to, deleting or switching it, the display control means displays the nodes successively in accordance with the manipulated order of the link information.

In this manner, where the hypertext has a plurality of links established between the nodes, these links may be arranged into a desired order that may be manipulated as needed. The hypertext, composed of the nodes holding information and of link information defining the relations between the nodes, has the link information put into a desired order so that the information held by each of the nodes may be displayed successively according to the link information thus ordered.

The link information management means gives a particular order to the link information for management purposes by storing the individual items of that information in a data constitution that may be put into the desired order. The link order manipulation means, for its part, manipulates the order of the link information by referencing, adding to, deleting and switching any of the individual items of the data constitution. The order of the link information is thus easy to manipulate as desired.

The link information browse means that may be preferably furnished provides a list format display, on the display screen, of the order of at least a designated part of the link information managed by the link information management means in connection with the manipulation of the link information order. At this point, the user interface means is used to manipulate directly the order of the link information displayed in list format on the display screen by the link information browse means. This allows the user to manipulate, easily on the screen, the order of the link information defining the relations between the nodes.

As outlined, the link information that defines the relations between the nodes may be arranged into a desired order for management purposes. With the order of the link information established, it is easy to reference, add, delete or switch the N-th link information item within the link information order. The user or program may readily designate and manipulate any node linked to a particular node. This makes it possible to build with ease an application program illustratively causing the display of the nodes to be switched in a specific order and at predetermined intervals.

These and other objects, features and advantages of the invention will become more apparent upon a reading of the following description and appended drawings.

DESCRIPTION OF THE PREFERRED EMBODIMENT

Figure 1:
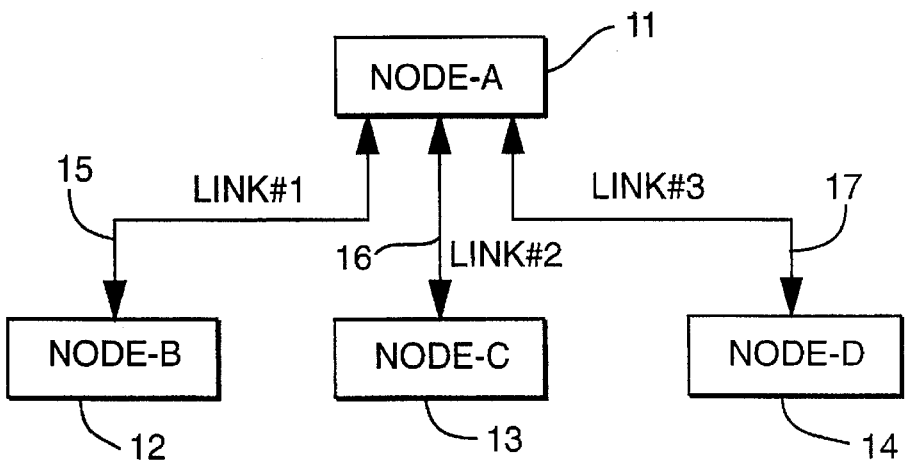
FIG. 1 is an overall conceptual view of a typical data constitution composed of nodes and links for use with a typical hypertext apparatus.
Figure 2:
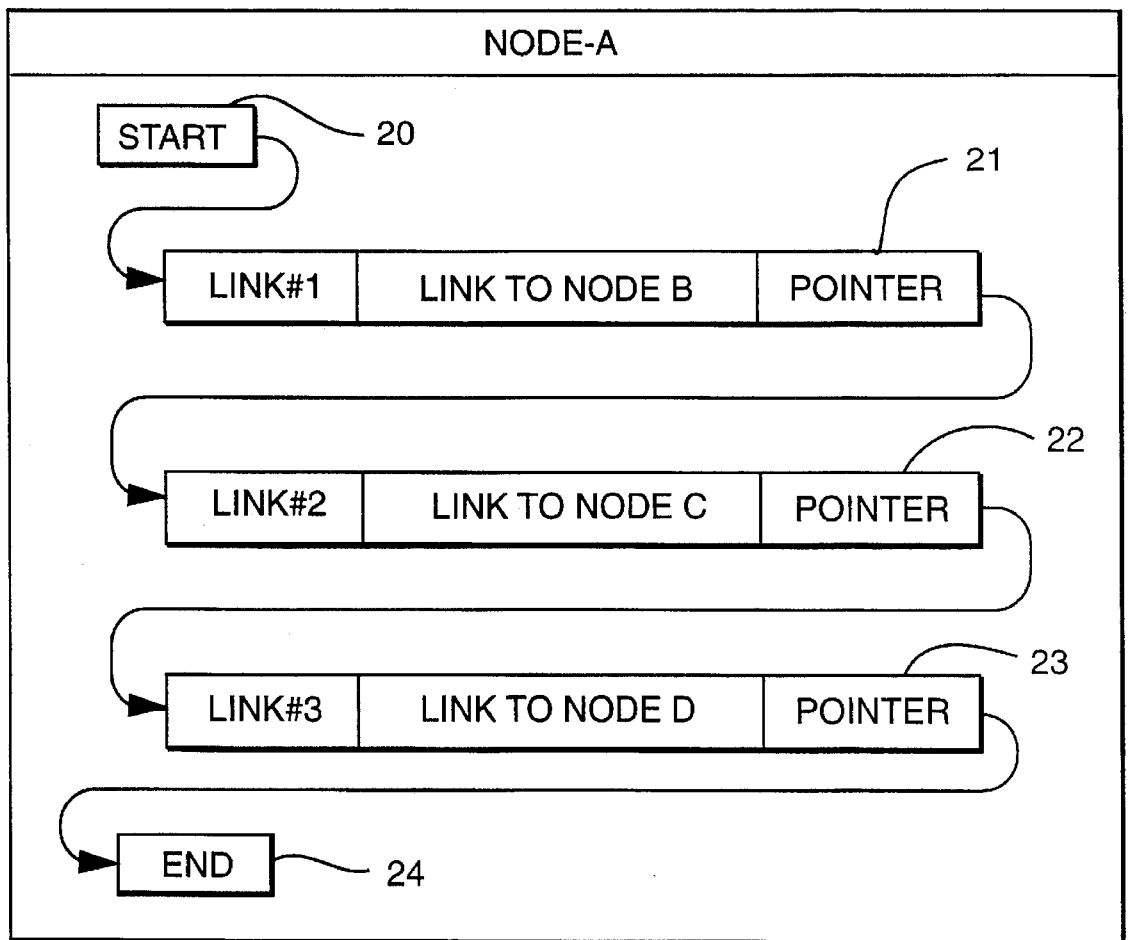
FIG. 2 is a view depicting typical link information held by a node.
Figure 3:
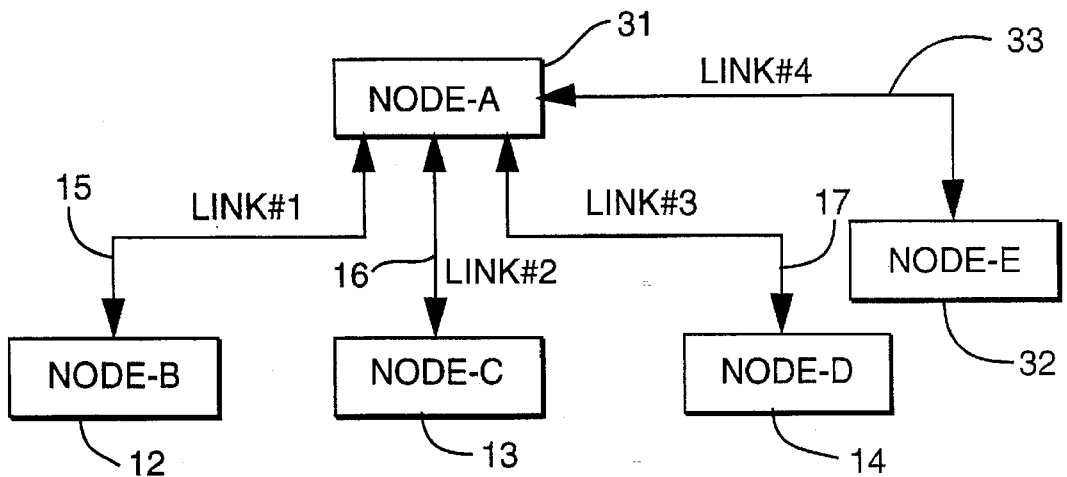
FIG. 3 is an overall conceptual view of the data constitution of a node group being supplemented by a new node.
Figure 4:
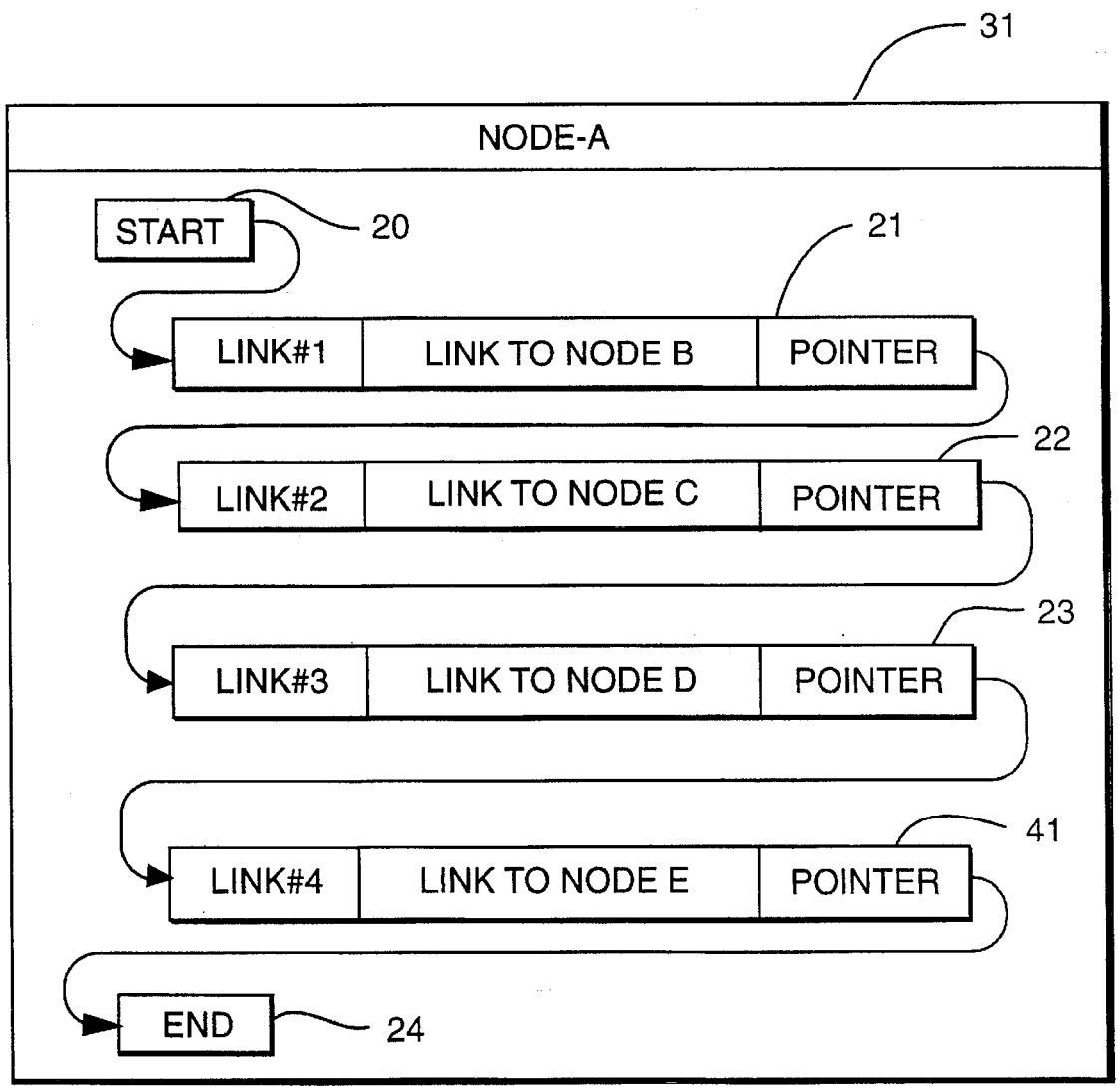
FIG. 4 is a view showing typical link information held by the node A when new link information is added.
Figure 5:
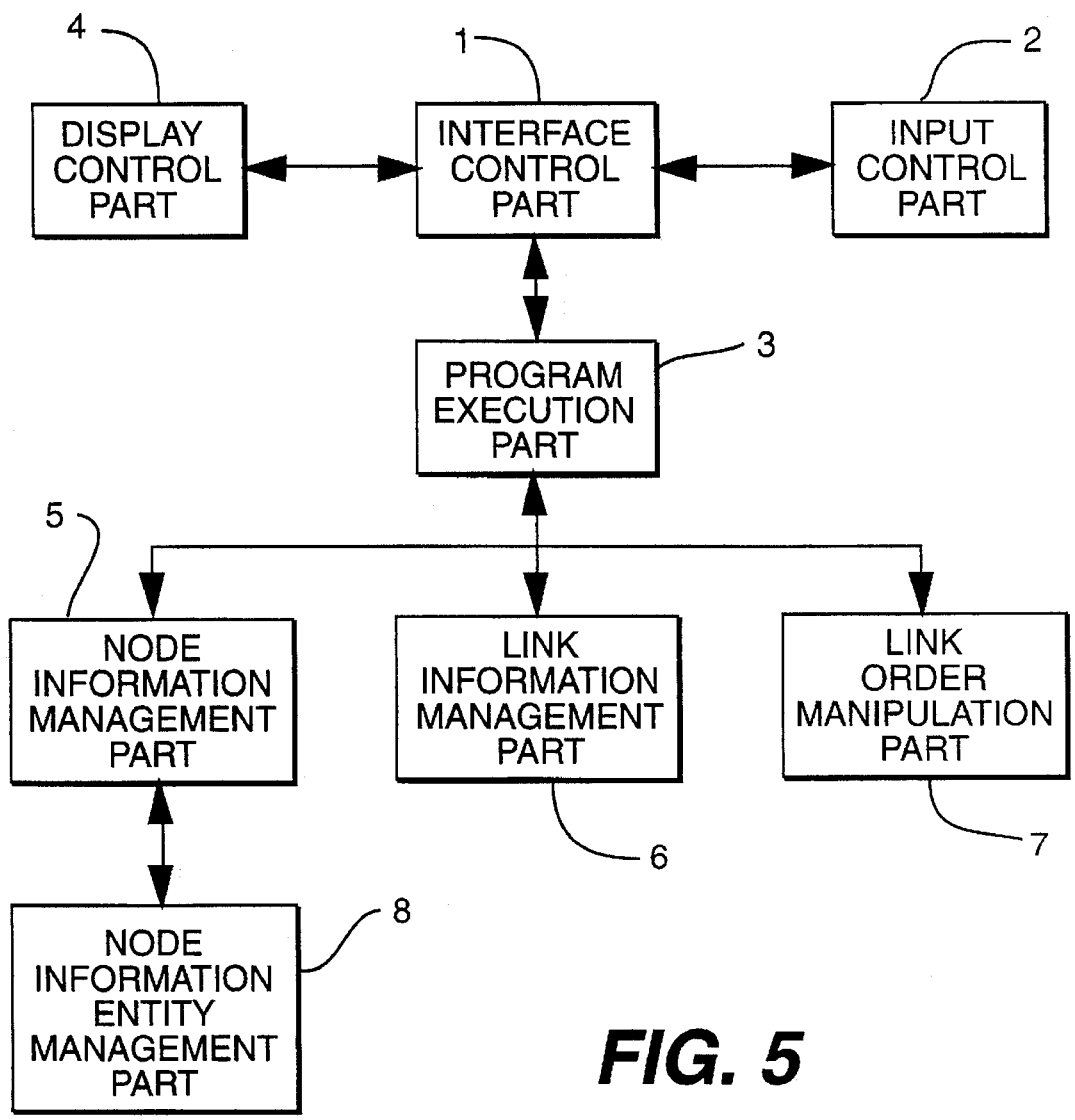
FIG. 5 is a block diagram of major component parts constituting a hypertext apparatus practiced as a preferred embodiment of the invention.

One preferred embodiment of the invention will now be described with reference to the accompanying drawings. FIG. 5 is a block diagram of major component parts constituting a hypertext apparatus practiced as the preferred embodiment of the invention. In FIG. 5, reference numeral 1 is an interface control part; 2 is an input control part; 3 is a program execution part; 4 is a display control part; 5 is a node information management part; 6 is a link information management part; 7 is a link order manipulation part; and 8 is a link information entity management part. Nodes serve as the units of such information as text information, image information, sound information and motion pictures. Links form a data constitution which describes the relations between nodes and which may be interpreted by the program or by the system. In other words, links make up an object comprising a set of mutually related nodes.

The embodiment of FIG. 5 includes processing elements for managing nodes and for putting into an order the link information defining the relations between the nodes, in addition to the processing elements which are intrinsic to hypertext apparatuses and which retain the node information of the hypertext. The interface control part 1 controls the user interface associated with the nodes and links of the hypertext, and notifies the program execution part 3 of an event whose occurrence may be detected by the input control part 2. The interface control part 1 causes the display control part 4 to display the information entities of nodes in a window on a display.

The input control part 2 notifies the interface control part 1 of a user operation event acquired from such input devices as a keyboard and a mouse. Under the directions of the interface control part 1, the program execution part 3 tells the node information management part 5, link information management part 6 and link order manipulation part 7 respectively to generate a node, to generate a link and to manipulate the link order. The display control part 4, under control of the interface control part 1, displays information in the designated display area.

The node information management part 5 manages a plurality of node information structures holding the information about each node. The link information management part 6 manages a plurality of link information structures defining the relations between the nodes. The link order manipulation part 7 changes the order of a plurality of link information structures 10 referenced by the node information management part 5 under the directions of the program execution part 3. The node information entity management part 8 manages such node information as character strings, images, motion pictures and sounds stored illustratively in primary or secondary storage. The node information is referenced from each node as entity information.

Figure 6:
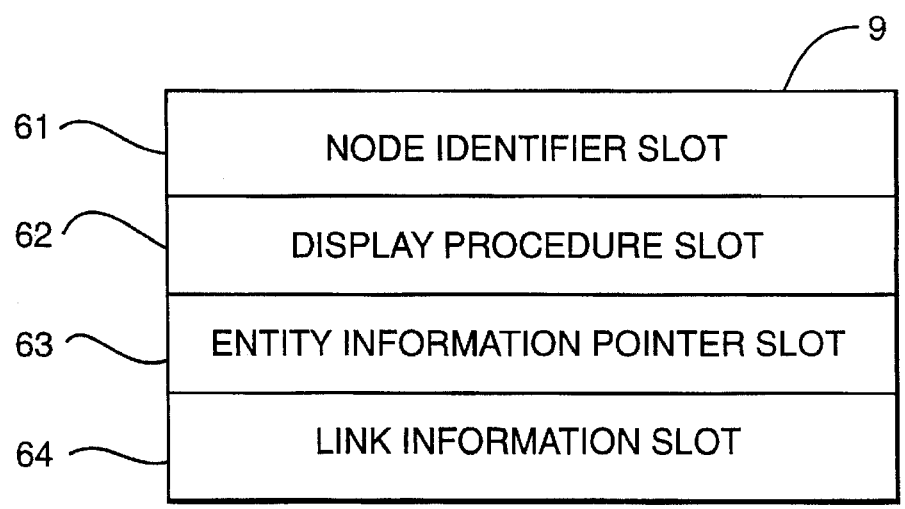
FIG. 6 is a view showing members of a node information structure held by a node information management part of the embodiment.

FIG. 6 is a view showing members of a node information structure held by the node information management part 5. As shown in FIG. 6, the members making up the node information structure 9 held by the node information management part 5 (see FIG. 5) reside in a node identifier slot 61, a display procedure slot 62, an entity information pointer slot 63 and a link information slot 64. The node identifier slot 61 is used to identify uniquely this node information structure within the system. The display procedure slot 62 retains the pointer pointing to a procedure program function used when the node in question is to be displayed on the screen. The entity information pointer slot 63 retains the pointer pointing to the entity information to be displayed by the node in question. The entity information thus pointed to may be a character string, image information, motion pictures or sounds. The link information slot 64 retains, in a list format data constitution, the pointer pointing to the link information structure for holding the link information attached to the node in question.

Figure 7:
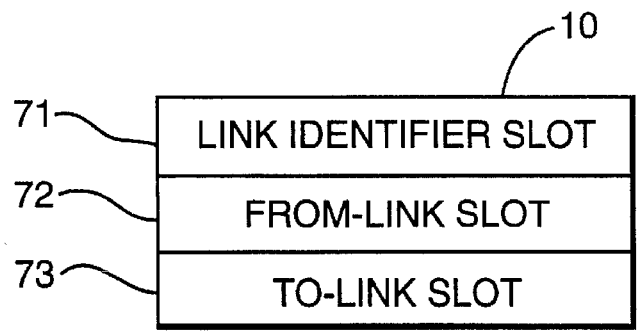
FIG. 7 is a view depicting slots in a link information structure managed by a link information management part of the embodiment.

FIG. 7 is a view depicting slots in the link information structure managed by the link information management part 6. As shown in FIG. 7, the slots making up the link information structure 10 managed by the link information management part 6 (see FIG. 5) comprise a link identifier slot 71, a from-link slot 72 and a to-link slot 73. The link identifier slot 71 is used to identify uniquely this link information structure within the system. The from-link slot 72 retains the pointer pointing to the node information structure of, say, the node A when a link is set illustratively to link the node A to the node B. The to-link slot 73 retains the pointer pointing to the node information structure of the node B when, as in the example above, a link is set to link the node A to the node B.

Figure 8:
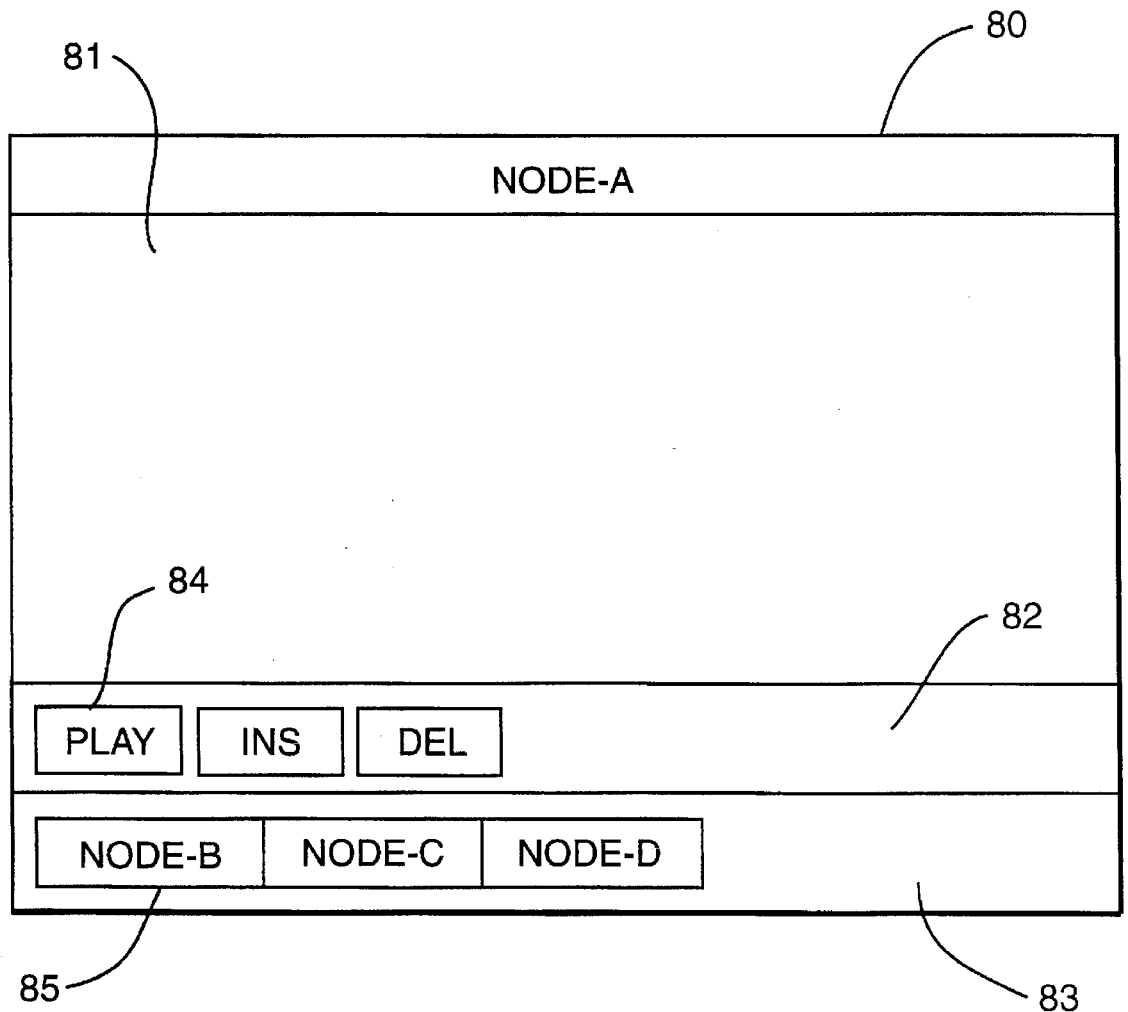
FIG. 8 is a view of a typical user interface screen display given by an application program running on the embodiment.

How the embodiment of the invention works will now be described illustratively using a case in which the order of links between nodes is manipulated. FIG. 8 is a view of a typical user interface screen display provided by an application program running on the embodiment. As depicted in FIG. 8, the interface control part 1 and display control part 4 (see FIG. 5) act to open a window 80 in which to display the node A. The window 80 is made up of a node content display area 81, an operation designating area 82 and an order display area 83.

The user interface of the embodiment is implemented by use of the three areas in the window 80. In the window 80, the node content display area 81 displays the entity information of the node group linked in a particular order starting from the current node. The operation designating area 82 displays screen buttons 84 (PLAY, INS, DEL). The PLAY button is used to designate a display of nodes according to their order; the INS button, when used, designates insertion of a node; the DEL button is used to delete a node. The user interface function allows any of these buttons to be designated as desired. The order display area 83 displays, in a left-justified manner and according to the link information order, icons 85 representing each of the nodes linked starting from the current node. The icons 85 show in a list format the links connected to the current node and the order in which these links are established.

In the window of the node A in FIG. 8, the icons representing the node B, node C and node D appear left-justified. The link information of the node A indicates that the node A is linked to the nodes B, C and D, in that order. If the order of the icons 85 shown left-justified in the order display area 83 is changed, the order of the link information items set in the node A is also changed accordingly.

For example, a mouse may be operated (in conjunction with a graphical user interface function) to switch the icon positions of the nodes B and C (i.e., node C placed to the left of node B) in the left-justified order. This operation changes accordingly the order of the link information specific to the node A.

Figure 9:
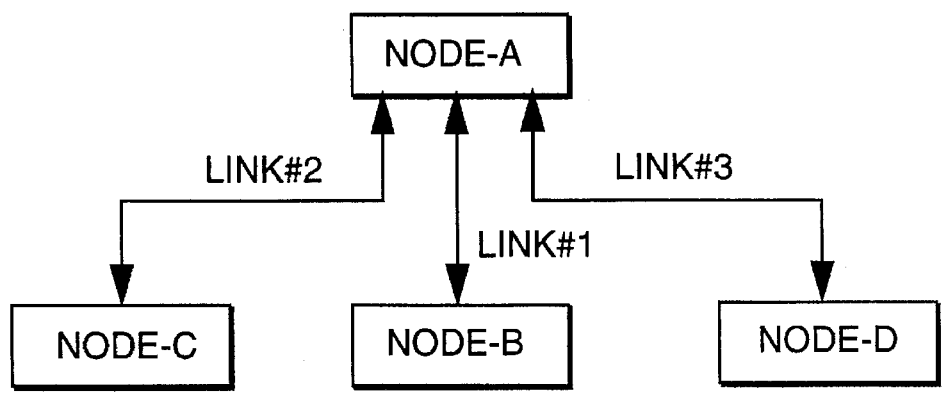
FIG. 9 is a conceptual view of typical nodes and links and the relations in effect therebetween when the order of link information is changed.

FIG. 9 is a conceptual view of typical nodes and links and the relations in effect therebetween when the order of link information is changed. Shown in FIG. 9 is the state in which three nodes B, C and D are linked to the node A by way of the link information "link #2," "link #1" and "link #3," respectively. In this case, the link information "link #2" is followed by "link #1" and "link #3," in that order from left to right.

Suppose that the PLAY button is clicked with the mouse in the operation designating area 82 of the window 80 of the node A, in order to designate the display of node contents in the order specific to the node A. In that case, the node information of the nodes linked successively according to the link information of the node A is displayed. Specifically, the content of the node A is displayed first followed by the contents of the nodes C, B and D, in that order, inside the node content display area 81 of the window 80.

Figure 10:
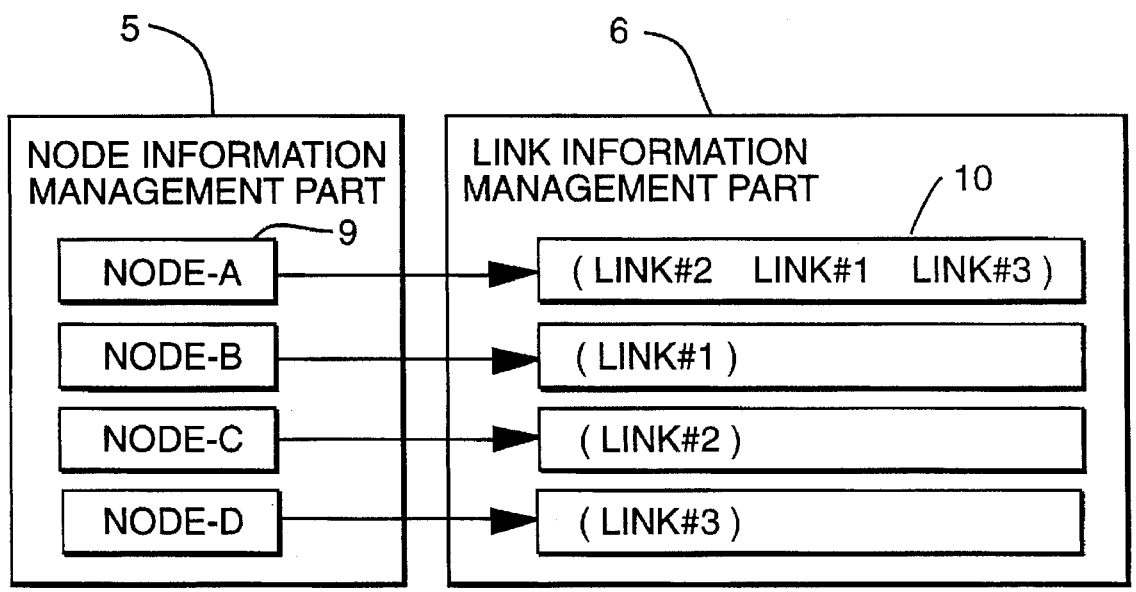
FIG. 10 is a schematic view of a data constitution in which the hypertext data of the nodes and links in FIG. 9 is stored in the node information management part and link information management part of the embodiment.

These nodes and the linked data constitution thereof will now be described. FIG. 10 is a schematic view of a typical data constitution in which the hypertext data of the nodes and links in FIG. 9 is stored in the node information management part and link information management part of the embodiment. As explained above, the node A is linked to the node C, node B and node D, in that order. This means that the link information in the node information structure of the node A is held as "link #1, link #2, link #3" in a link information order storage of the link information management part; the state of the links and their order are thereby set in the link information order storage.

Figure 11:
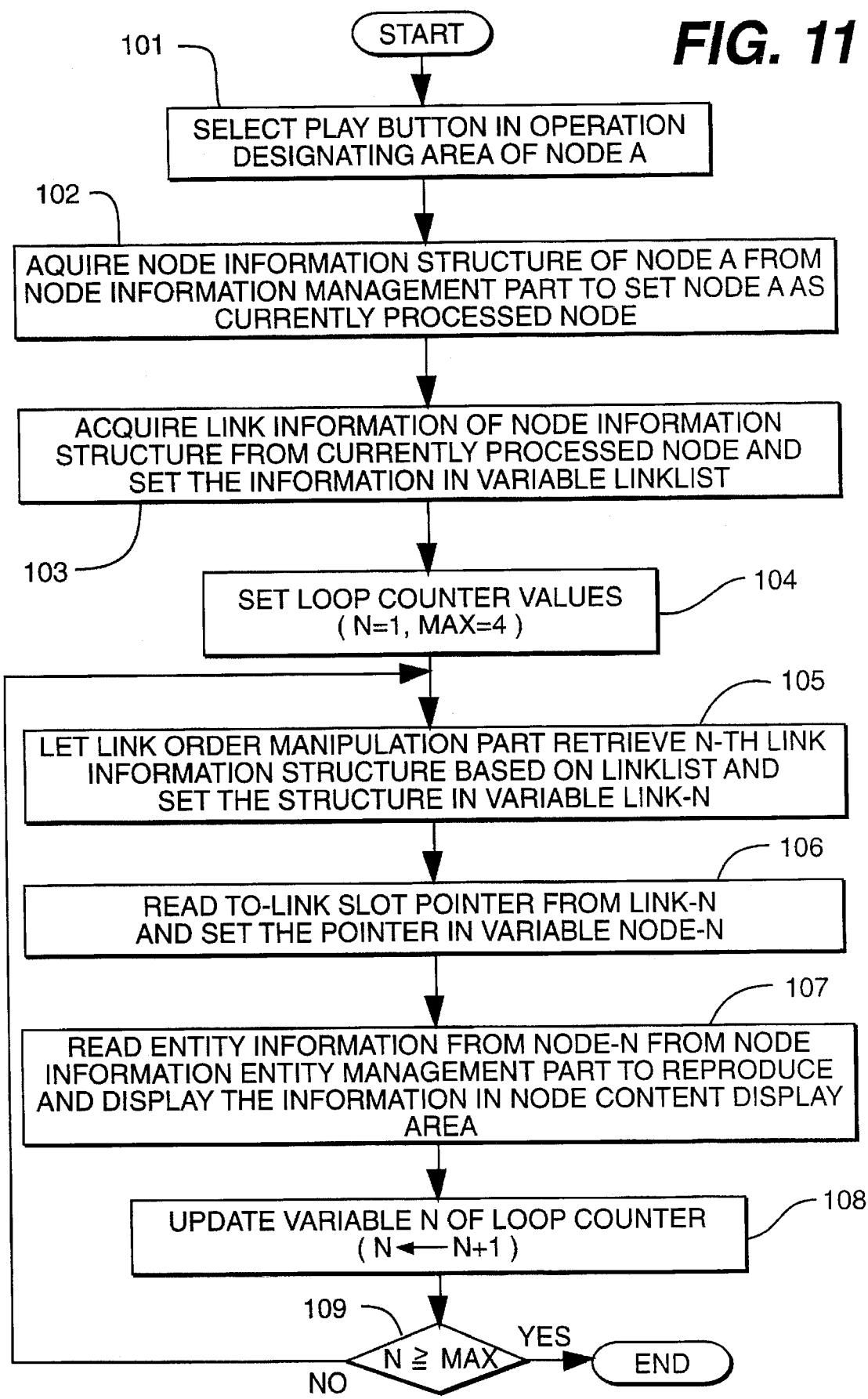
FIG. 11 is a flowchart of steps in which the embodiment displays the contents of nodes in accordance with the order of their links.

FIG. 11 is a flowchart of steps in which the embodiment displays the contents of nodes in accordance with the order of their links. This processing is started using the mouse to click the "PLAY" button in the operation designating area 82 of the window 80 in FIG. 8. The contents of the linked nodes are displayed in the order set by the link information.

In step 101, the input control part 2 detects an operation of the "PLAY" button effected with the mouse (i.e., mouse event) in the operation designating area 82. The detected event is reported to the interface control part 1. Step 102 identifies the node A displayed in the display screen position where the mouse was operated. The node A is set as the currently processed node after the node information structure of the node A is acquired from the node information management part 5.

In step 103, the link information of the node information structure is acquired from the currently processed node A and is set in a variable "LINKLIST." In step 104, values are set on a loop counter. That is, the count variable "N" is initialized to 1, and the final value variable "MAX" is set to the number of elements in the variable "LINKLIST."

In step 105, various items of the node information start to be displayed consecutively. First, the link order manipulation part 7 searches for and retrieves the N-th link information structure based on the link information established in the variable "LINKLIST," and sets the retrieved link information structure in a variable "LINK-N." If the link information is furnished illustratively in a list format data constitution, the processing above of search and retrieval is implemented by use of, say, the NTH function for LISP processing systems.

In step 106, that link information structure in the variable "LINK-N" which was retrieved and set in the preceding step 105 is referenced. The pointer to the next node information structure pointed to by the pointer in the to-link slot of the link information structure is set in a variable "NODE-N." This provides information pointing to the N-th node whose content is to be displayed next. Step 107 accesses and reads the entity information linked by the entity information pointer of the node information structure designated by the pointer pointing to the acquired node. When the entity information (character string, image, sounds, motion pictures) is acquired from the node information entity management part 8, the content of the acquired information is reproduced and displayed in the node content display area 81 of the window 80 by applying the program which is associated with the pointer in the display procedure slot 62 of the node information structure 9.

In step 108, the variable "N" of the loop counter is updated. Specifically, the count variable "N" is incremented by 1. In step 109, the count variable "N" of the loop counter is compared with its final value variable "MAX." If the value "N" is equal to or greater than the value "MAX" (N>MAX), the processing is terminated. If the result of the comparison is other than N>MAX, step 105 is reached again. In step 105, the next node information is reproduced in accordance with the next link information. The processing above is carried out so that the node C is displayed followed by node B and node D, in accordance with the order of the link information.

Figure 12:
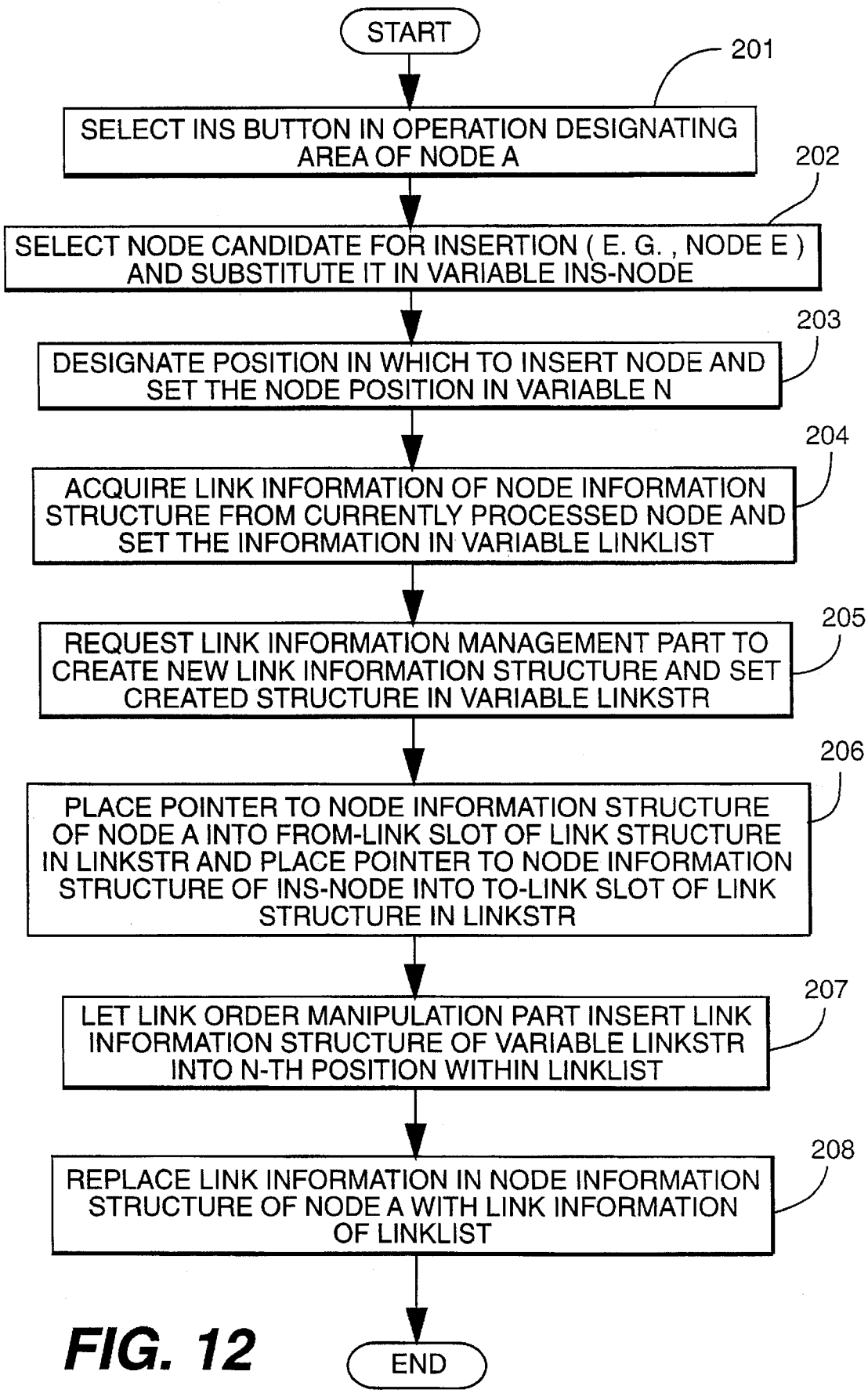
FIG. 12 is a flowchart of steps in which the embodiment inserts a node into a group of nodes.

Described below is how to insert a node E immediately after the node C in the setup of FIG. 9. FIG. 12 is a flowchart of steps depicting how the embodiment illustratively inserts a node into a group of nodes. This processing is started using the mouse to click the "INS" button in the operation designating area 82 of the window 80 in FIG. 8.

In step 201, the interface control part 1 detects via the input control part 2 an operation of the "INS" button effected with the mouse (a mouse event) in the operation designating area 82. This causes the display control part 4 to display illustratively an insertable node candidate menu indicating that the insertion processing has started. In step 202, the user selects the node candidate for insertion from the insertable node candidate menu. The node information structure (i.e., node candidate for insertion) associated with the selected node is substituted in a variable "INS-NODE." It is assumed in this example that the node E is selected for insertion.

In step 203, the user designates the position into which to insert the selected node E. This initiates the search for and the detection of the N-th node position in which to insert the node E. The detected position is set in the variable "N." Step 204 reads the link information of the node information structure associated with the currently processed node A which is displayed in the node content display area of the window. The link information thus read out is set in the variable "LINKLIST."

In step 205, a request is made for the link information management part 6 to generate a new link information structure. This step is needed to create a new link between the currently processed node A and the node candidate for insertion (node E). The link information structure generated anew is stored in a variable "LINKSTR."

In step 206, the pointer to the node information structure of the currently processed node A is placed into the from-link slot of the link information structure stored in the variable "LINKSTR." The pointer to the node information structure associated with the insertion node candidate (node E) and held in the variable "INS-NODE" is placed into the to-link slot of the link information structure stored in the variable "LINKSTR."

In step 207, the link order manipulation part 7 inserts the link information structure held in the variable "LINKSTR" into the N-th position in the link information structure list of the link information in the variable "LINKLIST." In step 208, the link information slot in the node information structure of the node A is replaced with the content of the variable "LINKLIST" containing the new link information structure. This completes the insertion processing.

The steps described allow the new node (node E in the example above) to be linked to the node A in the order designated by the user. With this accomplished, the PLAY operation described with reference to the flowchart of FIG. 11 may be performed on the node A, and the node E will then be displayed as the N-th node.

As described, the hypertext apparatus of the invention offers a user interface capable of putting into a desired order the links between the nodes to be managed and of manipulating the established link order. This makes it easy to create illustratively an application program allowing the display of node contents to be switched in a desired order and at predetermined intervals on the hypertext apparatus. It is also possible to build with ease a system for arranging information that emphasizes temporal relations between nodes (e.g., chronological tables).

As many apparently different embodiments of this invention may be made without departing from the spirit and scope thereof, it is to be understood that the invention is not limited to the specific embodiments thereof except as defined in the appended claims.

What is claimed is:

1. A system for managing hypertext information composed of nodes holding information and of link information for each node defining the relations between each said node and other nodes so as to display the information held by each of said nodes in accordance with said link information, said system comprising:

node information storage means for managing said nodes and for storing the information held by said nodes;

link information management means for arranging said link information into an order defining relations between said nodes;

link order manipulation means for manipulating the order of said link information; and display control means for displaying said information held by the nodes in said node information storage means successively in accordance with the order of said link information;

wherein said link information management means stores individual items of said link information in a data constitution that may be put into a desired order, and wherein said link order manipulation means references, adds to, deletes and switches any of the individual items of said data constitution.

2. A system for managing hypertext information composed of nodes holding information and of link information for each node defining the relations between each said node and other nodes so as to display the information held by each of said nodes in accordance with said link information, said system comprising:

node information storage means for managing said nodes and for storing the information held by said nodes;

link information management means for arranging said link information into an order defining relations between said nodes;

link order manipulation means for manipulating the order of said link information;

display control means for displaying said information held by the nodes in said node information storage means successively in accordance with the order of said link information; and link information browse means for providing a list of format display, on a display screen, of the order of at least a designated part of said link information managed by said link information management means.

3. The system according to claim 2, further comprising user interface means for directly manipulating the order of said link information displayed on said display screen by said link information browse means.

4. A system for managing hypertext information composed of nodes holding information and of link information for each node defining the relations between each Said node and other nodes so as to display the information held by each of said nodes in accordance with said link information, said system comprising:

node information storage means for managing said nodes and for storing the information held by said nodes;

link information management means for arranging said link information into an order defining relations between said nodes;

link order manipulation means for manipulating the order of said link information: and display control means for displaying said information held by the nodes in said node information storage means successively in accordance with the order of said link information;

wherein said link information management means has a storage part for storing the order of said link information.

5. A system for managing hypertext information composed of nodes holding information and of link information for each node defining the relations between each said node and other nodes so as to display the information held by each of said nodes in accordance with said link information, said system comprising:

node information storage means for managing said nodes and for storing the information held by said nodes;

link information management means for arranging said link information into an order defining relations between said nodes;

link order manipulation means for manipulating the order of said link information; and display control means for displaying said information held by the nodes in said node information storage means successively in accordance with the order of said link information;

wherein the information held by the nodes are multimedia information.

6. A system for managing hypertext information composed of nodes holding information and of link information for each node defining the relations between each said node and other nodes so as to display the information held by each of said nodes in accordance with said link information, said system comprising:

node information storage means for managing said nodes and for storing the information held by said nodes;

link information management means for arranging said link information into an order defining relations between said nodes;

link order manipulation means for manipulating the order of said link information; and display control means for displaying said information held by the nodes in said node information storage means successively in accordance with the order of said link information;

wherein said display control means switches the display of the information held by the nodes one after another at a predetermined interval.

* * * * *